Nov. 1, 1960 T. J. McNALLY 2,958,760
UNIVERSAL AUTOMOBILE REPAIR LAMP
Filed April 13, 1959
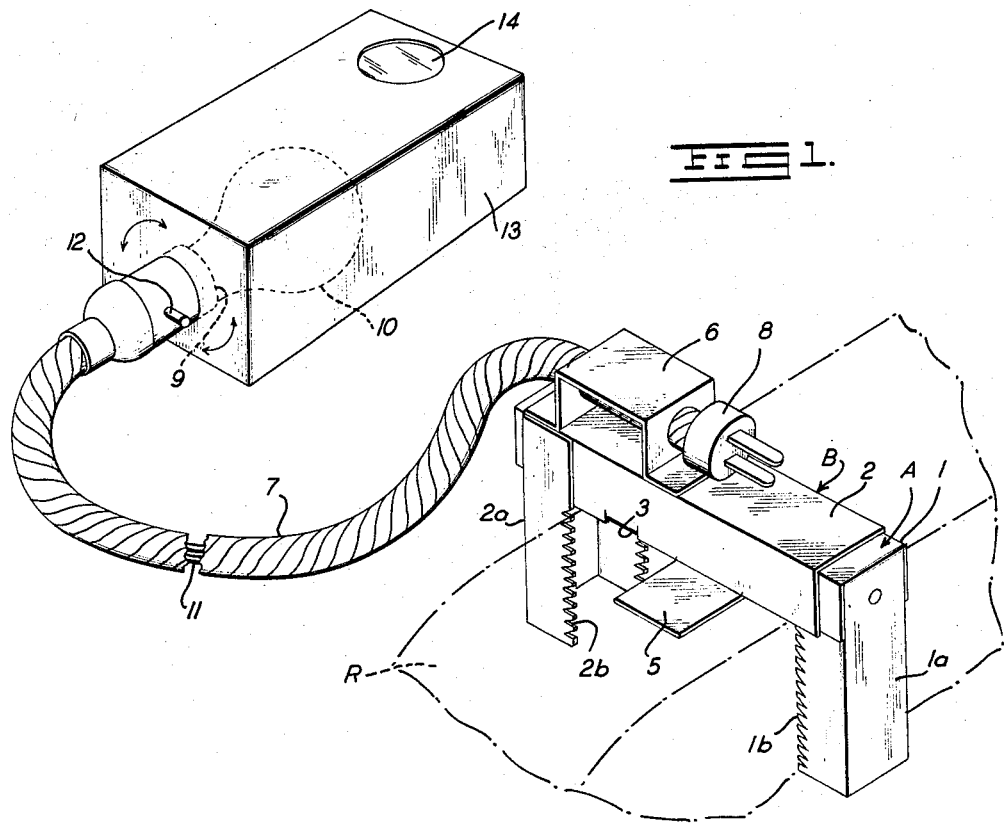
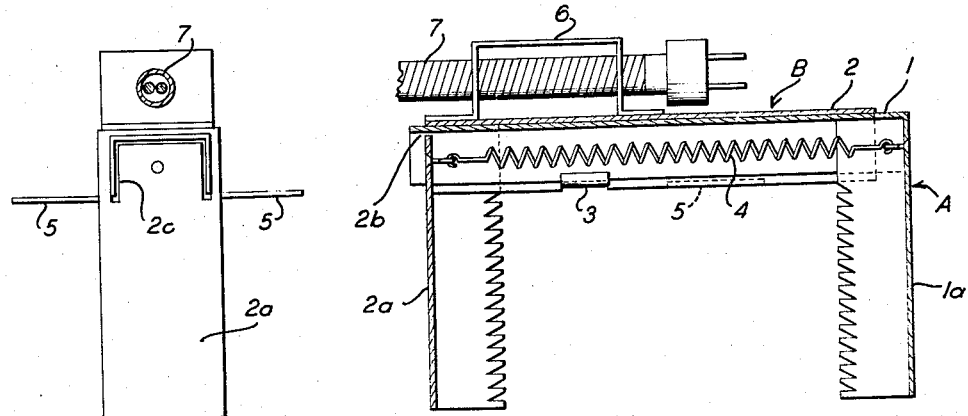

United States Patent Office 2,958,760
Patented Nov. 1, 1960.

2,958,760

UNIVERSAL AUTOMOBILE REPAIR LAMP

Thomas J. McNally, 5200 13th Ave. N.,
St. Petersburg 10, Fla.

Filed Apr. 13, 1959, Ser. No. 806,048

2 Claims. (Cl. 240—2)

This invention relates to means for furnishing illumination when working on or about automobiles, and more particularly to lamps adapted to be clamped upon the automobile structure and capable of universal adjustment to direct the light upon selected working areas.

An important object of the invention is to provide a universal lamp of the above character which includes a support adapted to be clamped upon the radiator, or other fixed part of an automobile, and having a gooseneck carrying upon its outer end a socket for an electric light bulb connected in circuit with a pair of conductors extending through the gooseneck which are capable of being plugged in to a source of electrical current, the gooseneck being bendably adjustable to illuminate different working areas without the necessity of shifting the lamp support.

Another object of the invention is to provide a universal lamp of the above character including a guard for the electric light bulb having a magnifying lens mounted therein located beyond the light bulb, whereby the guard serves as a reflector for illuminating a large working area while the lens permits the workman to obtain a magnified view, when desired, of the particular parts of the automobile being worked upon.

A further object of the invention is to provide a universal lamp of the above character including a guard for the electric light bulb rotatably mounted relative to the bulb, the guard being of flat-sided construction so as not to roll when placed upon the floor or other flat surface.

Still another object of the invention is to provide a universal lamp of the above character in which the lamp support comprises two relatively slidable sections each terminating in a down-turned arm, and a spring for drawing the two sections together to cause the arms to yieldingly engage opposite sides of the radiator of an automobile and clamp the support in stable, non-tipping position upon the radiator.

Other objects and advantages will be apparent from the following detailed description of a preferred embodiment of the invention, reference being made to the accompanying drawing in which:

Figure 1 is a perspective view of a universal automobile repair lamp and lamp support assembly;

Figure 2 is an end view of the lamp support viewed from the left-hand side of Figure 1; and Figure 3 is a longitudinal cross-sectional view of the lamp support.

The universal lamp shown in the drawing comprises a pair of companion slidable sections A and B of generally the same construction. The section A may be made of light-gage sheet metal and is constituted of a transverse channel-shaped slide member 1, as best shown in Fig. 1, having one end 1a bent downwardly to form an arm disposed at right angles to the transverse member so that the flanges of the channel-shaped arm underlie and are spot-welded to the corresponding flanges of the transverse member. The section B is similarly constituted, as illustrated in Fig. 3, of a transverse slide member 2 of channel shape with an end bent at right-angles to the transverse member to define an arm 2a parallel to the arm 1a of the companion section A. The opposed gripping edges of the arms may be serrated as indicated at 1b and 2b.

The widths of the channels of the two slidable sections are so selected that the transverse member 1 snugly fits within the transverse member 2 and extends through a U-shaped slot 2c in the arm 2a, so that the two sections are relatively slidable to move the arms 1a and 2a either farther apart or closer together. To maintain the slide members in assembly, tongues 3, formed integral with the edges of the flanges of the outer slide member 2, are folded inwardly, as shown in Fig. 3, to loosely engage the corresponding flanges of the inner slide member 1. A coil spring 4 extends longitudinally within the space defined by the channels of the pair of slide members and opposite ends of the spring are attached to the arms 1a and 2a. The two sections A and B thus constitute a support which is capable of being clamped upon the top of a radiator R of an automobile in the manner illustrated in Fig. 1. To prevent accidental tipping of the lamp support, the marginal edges of the flanges of the channel of the slidable member 2, are formed with extension plates or wings 5 bent outwardly at right angles to the flanges to flatly engage the top of the radiator.

Welded or otherwise secured to the upper surface of the transverse slide member 2 is a U-shaped bracket 6 with its vertically-disposed ends provided with openings through which one end of a bendable hollow cable, or gooseneck 7, extends in the manner shown in the drawing. The inner end of the gooseneck projects beyond the bracket and is fitted with an electrical plug connection 8 by means of which the lamp may be connected, via an extension cord (not shown), to a source of electric current, such as an electrical outlet of a garage or, especially if repair work is being done along the highway, to the electrical system of the automobile itself.

The outer end of the gooseneck, opposite the one carrying the plug connection, terminates a substantial distance from the bracket 6 and carries a lamp socket 9 for receiving an electric light bulb 10. Conductors 11 passing through the interior of the gooseneck provide electrical connection between the plug 8 and the lamp socket 9. An electric switch 12 is suitably provided adjacent the lamp socket for turning the lamp on and off.

Rotatably mounted upon the outer end of the gooseneck is a metal, box-shaped lamp guard 13, overlying and laterally surrounding the electric light bulb 10. The guard normally serves as a reflector to reflect light from the bulb into the general area where work is being performed. Within the wall of the lamp guard opposite its open side a viewing opening is provided within which is mounted a lens 14. Because the rotatable, box-shaped lamp guard is flat-sided, it will stay in any position when it is placed on a flat surface and will not roll upon the floor and shine into the eyes of the workman as, for example, when he is making repairs underneath the automobile.

The universal lamp described above is capable of use in the following manner: When repairs are to be made, for example, to the engine of an automobile, the two slidable sections A and B are stretched apart far enough to allow the downwardly-extending arms 1a and 2a to fit over opposite sides of the radiator R with the plates 5 flatly abutting the top of the radiator. When the arms are released, the coil spring 4 draws the arms together to firmly clamp the lamp to the radiator. The plug 8 having been connected by an extension cord to an available source of electric current, the switch 12 is snapped on to energize the electric light bulb 10. Thereafter, the gooseneck, which is of a suitable length for that purpose, is bent in any direction so as to best illuminate that part of the engine on which work is to be done. The lamp guard and reflector 13 is such as to distribute the light over a fairly wide field such as will usually be satisfactory for making general repairs. However, in those cases where more delicate adjustments and repair work are to be undertaken or where the places to be reached by the mechanic are difficultly visible, as, for example, when making adjustments to the ignition points of a spark plug or to the contacts of a distirbutor, the lamp guard is rotated upon its axis and the gooseneck is re-bent so as to bring the particular part under scrutiny into focus when viewed through the lens 14. Thus, the lamp affords two different types of illuminated observation, namely, a fairly wide spread of light for general repair work, and magnification of those areas where greater visibility for performing more precise repairs or adjustments is called for.

While the universal lamp has been described in connection with its adaptability for clamping to the radiator of an automobile, this is merely by way of example and it will be apparent that the lamp may be clamped to other parts of an automobile in the vicinity where illumination is desired. Thus the lamp may be clamped either in upright or in inverted position to the understructure of an automobile when work is being done beneath the chassis, the bendable gooseneck under all circumstances allowing the lamp to be positioned to afford maximum illumination of the operational area. When the lamp is detached from the vehicle, it may be laid upon the garage floor or other flat surface without rolling by reason of its flat sides and top.

It is to be understood that certain changes, alterations, modifications and substitutions can be made in the lamp described above without departing from the spirit and scope of the invention as defined in the following claims.

I claim:

1. A universally adjustable lamp for use in making automobile repairs comprising a pair of slidable channel members arranged in nested, interfitting relationship capable of spanning the top of an automobile radiator, each of said channels comprising two vertically disposed flanges and a transverse web connecting the flanges, the opposite ends of said channel members being provided with parallel, down-turned arms for engaging opposite sides of the radiator, stabilizing wings extending laterally outward from the flanges of one of said channels, a spring extending within the channels and having its opposite ends secured to the arms for resiliently drawing the arms together into clamping engagement with the radiator, a bracket secured to the outer face of the web of one of said channels, a hollow, bendable gooseneck having one of its ends disposed in the direction of length of the channel members and supported by the bracket and its opposite free end located a substantial distance from the bracket, conductors extending interiorly of the hollow gooseneck having an electrical connector adjacent the bracket-supported end of the gooseneck and a lamp socket adjacent the outer free end of the gooseneck, a switch for opening and closing an electrical circuit through the conductors, a lamp guard mounted upon the outer free end of the gooseneck remote from the bracket, said lamp guard mounted in overlying relation to the lamp socket and forming a reflector for a lamp mounted on the lamp socket.

2. A universally adjustable lamp as set forth in claim 1 wherein the lamp guard is of box-shaped, elongated construction adapted to completely encompass the three sides of a lamp mounted in the lamp socket and to project a substantial distance lengthwise beyond said lamp, said lamp guard having a viewing opening therethrough located longitudinally outwardly beyond the range of the position occupied by the light bulb and a magnifying lens mounted in said opening, and said lamp guard being mounted upon the free end of the gooseneck for pivotal movement about an axis disposed longitudinally of the lamp guard.

References Cited in the file of this patent

UNITED STATES PATENTS

| | | |
|---|---|---|
| D. 117,128 | Pike | Oct. 10, 1939 |
| 1,717,754 | Brady | June 18, 1929 |
| 2,185,164 | Weinreb | Dec. 26, 1939 |
| 2,247,022 | Hovorka | June 24, 1941 |
| 2,298,758 | Fisher | Oct. 13, 1942 |